US008864237B2

(12) United States Patent
Long

(10) Patent No.: US 8,864,237 B2
(45) Date of Patent: Oct. 21, 2014

(54) FOOTREST APPARATUS AND METHOD

(71) Applicant: Mac Ventures, L.L.C., Abilene, TX (US)

(72) Inventor: Mariana Long, Abilene, TX (US)

(73) Assignee: Mac Ventures, L.L.C., Abilene, TX (US)

( * ) Notice: Subject to any disclaimer, the term of this patent is extended or adjusted under 35 U.S.C. 154(b) by 0 days.

(21) Appl. No.: 13/925,570

(22) Filed: Jun. 24, 2013

(65) Prior Publication Data
US 2013/0278039 A1 Oct. 24, 2013

Related U.S. Application Data

(63) Continuation-in-part of application No. 13/109,180, filed on May 17, 2011, now abandoned.

(51) Int. Cl.
B60N 3/06 (2006.01)
A47C 7/50 (2006.01)
B60N 2/24 (2006.01)
B64D 11/06 (2006.01)
A47C 7/52 (2006.01)
B60N 2/44 (2006.01)

(52) U.S. Cl.
CPC ............... *A47C 7/506* (2013.01); *B60N 3/063* (2013.01); *B60N 2/242* (2013.01); *B64D 11/06* (2013.01); *B64D 2011/0648* (2013.01); *B60N 3/06* (2013.01); *B60N 2002/4405* (2013.01); *A47C 7/52* (2013.01)

USPC .................................................. 297/423.15

(58) Field of Classification Search
USPC .......................... 297/188.06, 188.18, 423.15
See application file for complete search history.

(56) References Cited

U.S. PATENT DOCUMENTS

| 402,130 | A | * | 4/1889 | Bedford | 297/273 |
| 1,218,876 | A | * | 3/1917 | Liverson | 297/423.4 |
| 1,738,557 | A | * | 12/1929 | Beiling | 297/188.18 |
| 3,285,658 | A | * | 11/1966 | Cleveland | 297/395 |
| 4,195,880 | A | * | 4/1980 | Henkhaus | 297/188.18 |
| 5,503,456 | A | * | 4/1996 | Rossini | 297/397 |
| 5,556,167 | A | * | 9/1996 | Johnson Siemion | 297/423.15 |
| 6,832,741 | B2 | * | 12/2004 | Jarosz | 244/122 R |
| 7,322,655 | B1 | * | 1/2008 | Williams et al. | 297/423.15 |
| 7,954,900 | B2 | * | 6/2011 | Shantha et al. | 297/423.4 |

* cited by examiner

Primary Examiner — Peter Brown
(74) Attorney, Agent, or Firm — Law Offices of Mark L. Berrier

(57) ABSTRACT

Systems and methods for enabling passengers to rest or elevate their feet. In one embodiment, an apparatus has a seat-back attachment portion, a support portion and a footrest portion integral to an adjustable loop of fabric. The seat-back attachment portion is positionable on a top or tray table of a seat-back. The support portion is coupled to the seat-back attachment and footrest portions and suspends the footrest portion at a variable height above the floor. The apparatus may include an integral cover which substantially encloses the apparatus when in a folded position. The footrest portion may have a substantially rigid lateral member, and may have padding secured to the rigid lateral member.

5 Claims, 5 Drawing Sheets

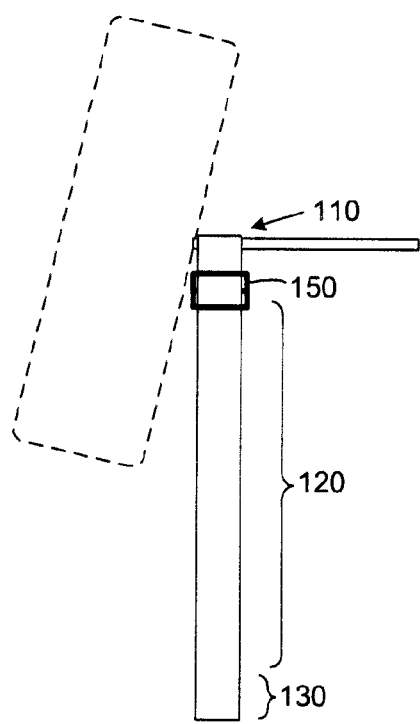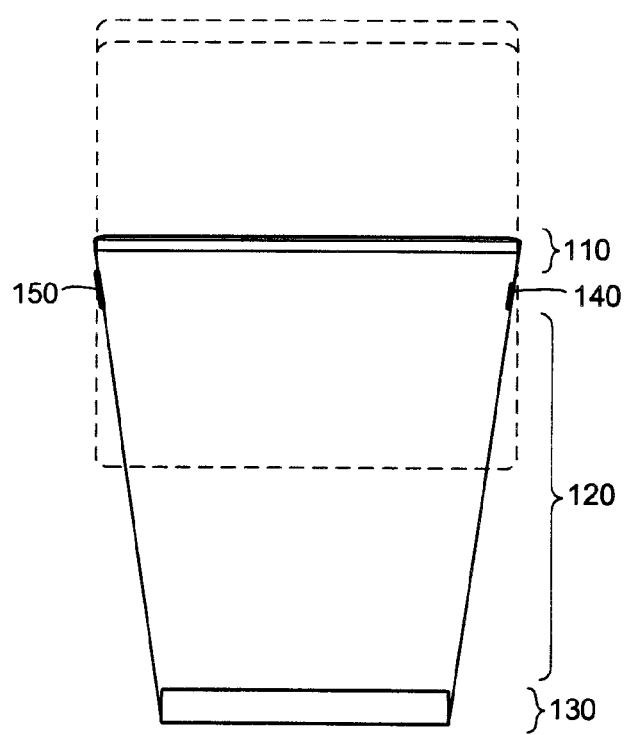
Fig. 5A
Fig. 5B

FOOTREST APPARATUS AND METHOD

CROSS-REFERENCE TO RELATED APPLICATIONS

This application is a continuation-in-part of U.S. patent application Ser. No. 13/109,180, By Mariana Long, filed May 17, 2011, which is incorporated by reference as if set forth herein in its entirety.

BACKGROUND

The invention relates generally to footrests and more particularly to systems and methods for supporting a user's feet in confined spaces such as between rows of seats on airplanes, trains and the like.

Seating on airplanes, trains, busses and the like may be very restrictive. In many cases, rows of seats are placed very close to each other in order to increase the number of passengers that may be accommodated. Often, particularly in coach-class seating, no footrests are provided for passengers, due to such considerations as space and economy.

The lack of a footrest may be more than a minor inconvenience for some travelers. For instance, because a passenger has little opportunity to leave his or her seat, and in some cases may not be allowed to leave the seat, the passenger's feet and legs do not get sufficient exercise or even movement to maintain proper blood circulation. As a result, the passenger may experience cramps, swelling, or even blood clots (e.g., deep vein thrombosis). This problem obviously becomes worse as the length of time during which the passenger is confined to the seat increases, such as on overseas flights, and may be aggravated for passengers of shorter stature, whose feet may not reach the floor.

SUMMARY OF THE INVENTION

Embodiments of the present invention may alleviate some of these problems by providing means for passengers to rest or elevate their feet. In one embodiment, an apparatus has a seat-back attachment portion, a support portion and a footrest portion. The seat-back attachment portion is configured to secure the apparatus to a seat-back. The support portion is coupled to the seat-back attachment portion and is configured to suspend the footrest portion above the floor. The support portion transfers weight from the footrest portion to the seat-back attachment portion. The seat-back attachment portion is configured to be removably positioned on top of the seat-back and held in position by the weight transferred by the support portion. The seat-back attachment portion may have a non-slip surface configured to contact the seat-back and prevent the seat-back attachment portion from slipping off the seat-back. The apparatus may include a cover which is connected to it. When the apparatus is in a folded position, the cover substantially encloses the apparatus and keeps it in the folded position. The support portion may be configured to adjustably suspend the footrest portion at a position which is a variable distance above the floor. The footrest portion may have a substantially rigid lateral member, and may have padding secured to the rigid lateral member. The apparatus may have an adjustable loop of fabric, a first portion of the loop forming the seat-back attachment portion, a second portion of the loop forming the support portion and a third portion of the loop forming the footrest portion.

An alternative embodiment comprises a method. In this method, a footrest apparatus including a seat-back attachment portion, a footrest portion, and a support portion coupled between the seat-back attachment portion and the footrest portion is provided. The seat-back attachment portion is positioned on a seat-back, and the support portion and footrest portion are extended downward from the seat-back attachment portion. A user's feet are then placed on the footrest portion, thereby suspending the user's feet above the floor. The method may further include adjusting a length of the support portion of the footrest apparatus, thereby changing a height at which the footrest portion of the footrest apparatus is suspended above the floor. The method may further include, prior to positioning the seat-back attachment portion on the seat-back, unfastening a cover which contains the footrest apparatus and unfolding the footrest apparatus. The method may further include removing the user's feet on the footrest portion, removing the footrest apparatus from the seat-back, folding the footrest apparatus and fastening a cover around the footrest apparatus. The method may further include placing the seat-back attachment portion of a loop of fabric on top of the seat-back. The method may further include placing the seat-back attachment portion of a loop of fabric over a tray table which is connected to the seat-back.

Numerous other embodiments are also possible.

BRIEF DESCRIPTION OF THE DRAWINGS

Other objects and advantages of the invention may become apparent upon reading the following detailed description and upon reference to the accompanying drawings.

FIGS. 5A and 5B are diagrams illustrating plan views of a footrest apparatus positioned on the tray table of a seat-back in accordance with one embodiment.

Figure 1:
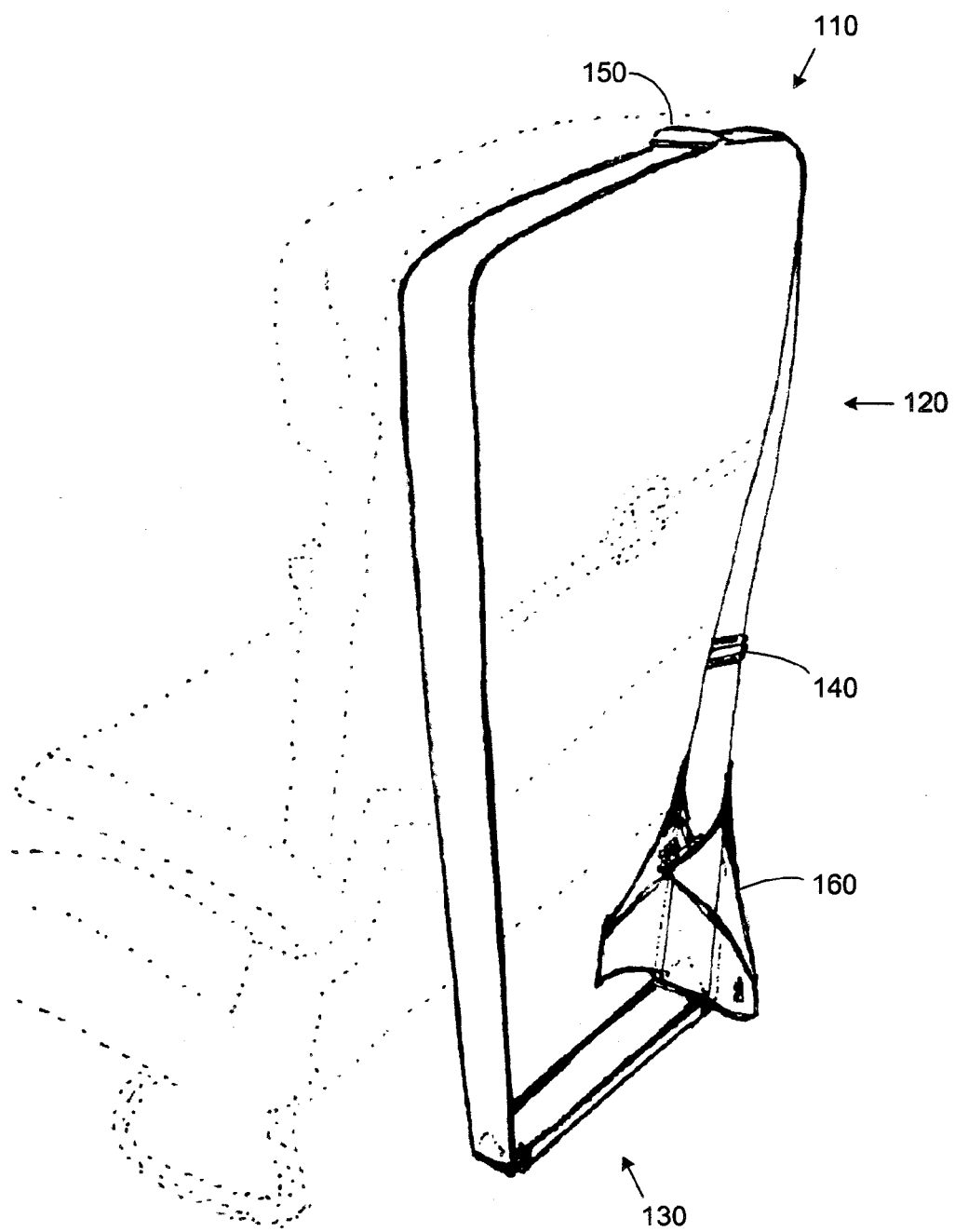
FIG. 1 is a diagram showing a perspective view of a footrest apparatus positioned on a seat-back in accordance with one embodiment.
Figure 2A:
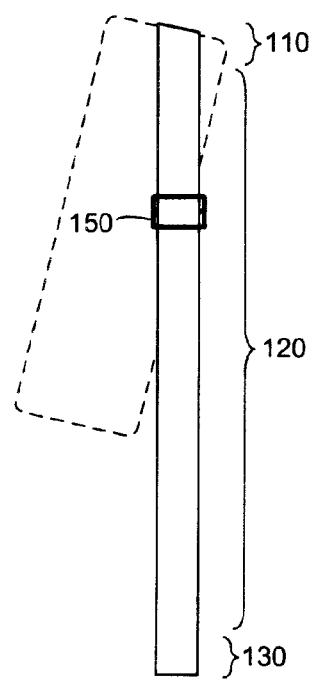
FIGS. 2A and 2B are diagrams illustrating plan views of a footrest apparatus positioned on top of a seat-back in accordance with one embodiment.
Figure 2B:
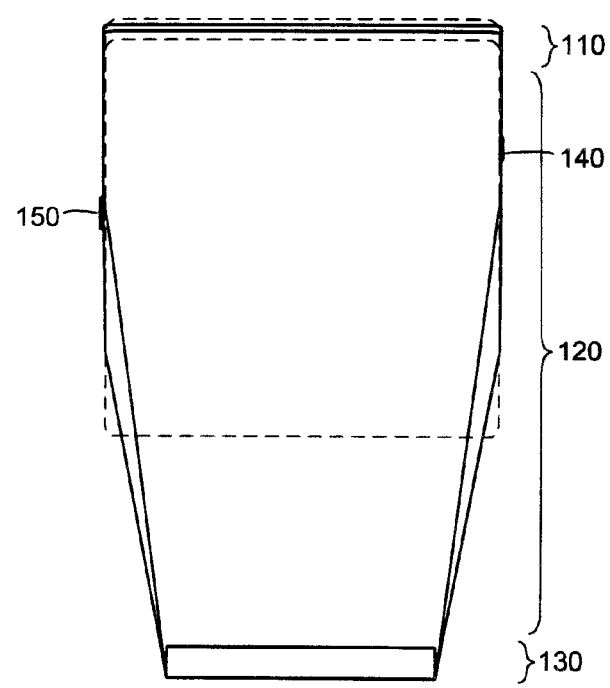

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for allowing passengers to rest or elevate their feet by providing a footrest that is attachable to the seat-back of a seat in front of the passenger.

One embodiment comprises a footrest apparatus that can be placed on the back of a seat in front of the passenger. The apparatus consists of a loop of fabric such as nylon webbing with a substantially rigid footrest attached to one side of the loop. The side of the loop opposite the footrest is placed over the top of the seat-back as shown in FIG. 1. (The seat and seat-back are shown by the dotted lines in the figure.) The sides of the loop extend downward along the sides of the seat, with the footrest suspended above the floor. The size of the fabric loop can be adjusted to vary the height at which the footrest is suspended. The footrest apparatus can be removed from the seat-back and folded so that it can be conveniently stowed, and includes an attached fabric cover that can be wrapped around it to hold it in a folded position.

An exemplary embodiment of the invention will be discussed in detail with reference to Referring generally to FIGS. 1-4. The footrest apparatus consists of three primary components: a seat-back attachment portion 110, a support portion 120, and a footrest portion 130. Seat-back attachment portion 110 provides a means to attach the apparatus to the seat in front of a passenger. Support portion 120 provides a means to suspend the footrest portion 130 above the floor. Footrest portion 130 provides a means to support the passenger's feet above the floor In this embodiment, the different portions of the footrest apparatus are formed in part from a loop of fabric. Seat-back attachment portion 110 is formed by one part of the loop, while footrest portion 130 is formed in an opposite side of the loop. Support portion 120 is formed by the two opposing portions of the loop that are between seat-back attachment portion 110 and footrest portion 130. The loop may be made of a material such as two-inch wide polyester webbing.

Seat-back attachment portion 110 is attached in this embodiment to the seat-back simply by placing the corresponding portion of the loop over the top of the seat-back. No fasteners are necessary, as the weight of the passenger's feet on the footrest will hold the fabric of the loop in position on top of the seat-back. A non-slip surface may be provided on the seat-back attachment portion of the loop to increase the friction between seat-back attachment portion 110 and the top of the seat-back.

The length of the fabric loop is adjustable. This allows the effective length of support portion 120 to be changed, thereby changing the height at which footrest portion 130 is suspended above the floor. The adjustability of the fabric loop is provided in this embodiment by a plastic loop 140 and triglide slide 150. The fabric loop consists of a length of webbing approximately 9 feet long. Plastic loop 140 is attached to one end of the webbing. The other end of the webbing is passed through slide 150 and plastic loop 140 and is then attached to the center of slide 150. The length of the resulting fabric loop is changed by changing the position of slide 150 on the webbing.

Figure 3:
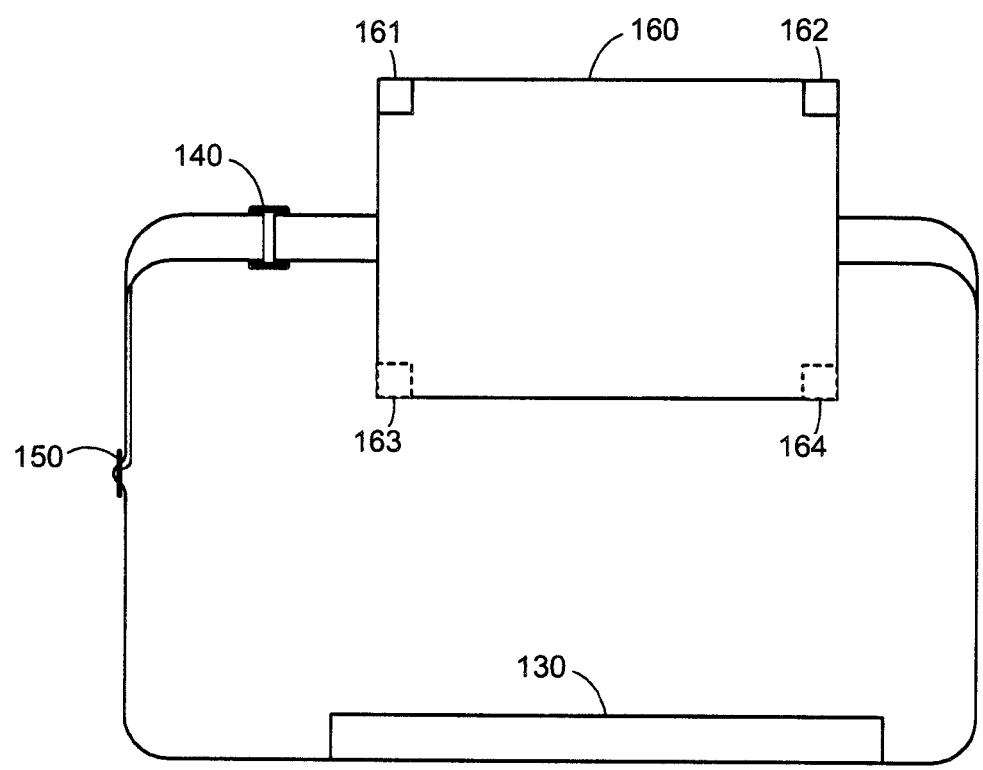
FIG. 3 is a diagram illustrating a footrest apparatus having an integral cover in accordance with one embodiment.
Figure 4A:
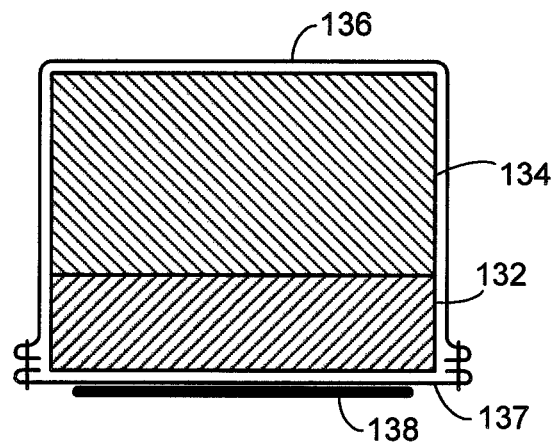
FIGS. 4A and 4B are diagrams illustrating the construction of the footrest portion of a footrest apparatus in accordance with two embodiments.
Figure 4B:
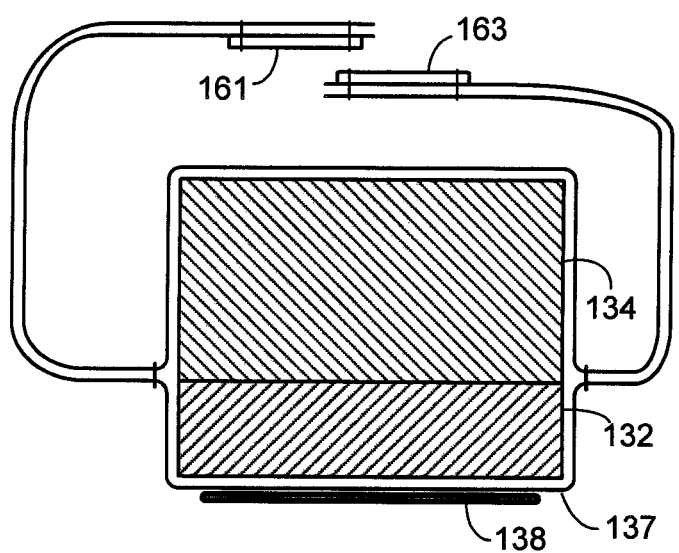

Footrest portion 130, in this example, includes a substantially rigid lateral member. This component provides a flat surface on which the passenger's feet can be positioned. Additionally, the rigid component prevents the loop from collapsing and pressing the passenger's feet together. In one embodiment, the rigid component of footrest portion 130 is a simple block of wood 132, approximately 12 inches long and 2-2.5 inches wide. A layer of padding 134 may be placed on top of the rigid component for added comfort. The wood and padding are sheathed in a layer of fabric which serves to protect the padding and which is easily attachable to the webbing 138 of the fabric loop The embodiment illustrated in FIG. 1 includes a fabric cover 160. When the footrest apparatus is not in use, the fabric loop can be folded and placed against footrest portion 130. Fabric cover 160 can then be wrapped around the folded apparatus to keep it in a folded position. The cover may conveniently be attached (e.g., sewn) to the fabric loop so that it cannot be misplaced. In another embodiment (see FIG. 4B), the cover can actually be integrated into footrest portion 130. In this embodiment, the ends of fabric 136, 137 are extended to form a cover that wraps around footrest portion 130. Any suitable means can be used to close the cover. In FIGS. 3 and 4B, squares of hook material (161, 162) and loop material (163, 164) are provided to fasten the cover around the footrest apparatus, although snaps, elastic closures or other means could be used. With the cover on the apparatus, it can be easily stowed in a briefcase or other carry-on luggage.

The described footrest apparatus can be easily used when traveling by airplane, train, or other conveyance. First, the cover is opened and the apparatus is unfolded. The attachment portion of the apparatus is then placed on top of the seat-back in front of the passenger. The support portion and footrest portion are extended downward, and the passenger adjusts the support portion so that the footrest portion is at a desired height. When the passenger is through using the apparatus, the attachment portion is removed from the seat-back and folded, and the cover is wrapped around it and fastened.

In an alternative scenario, the footrest apparatus can be used by placing the attachment portion over a tray table which is connected to the seat-back. This scenario is illustrated in FIGS. 5A and 5B. Preferably, the attachment portion is placed over the part of the tray table closest to the seat-back in order to minimize the stress on the tray table. The support portion of the footrest apparatus will likely have to be adjusted to shorten its length, since the tray table is lower than the top of the seat-back.

It should be noted that alternative embodiments may include variations of the features described above. For instance, rather than using a slide to adjust the length of the fabric loop, adjustably positioned hook-and-loop material or other means may be used. Alternative embodiments may also use different materials for the fabric loop, rigid footrest component, padding, cover, and the like. Still other variations, modifications, additions and improvements to the embodiments described above are possible. It is contemplated that these variations, modifications, additions and improvements fall within the scope of the invention as detailed within the following claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. An apparatus comprising:
   a seat-back attachment portion configured to secure the apparatus to a seat-back;
   a support portion coupled to the seat-back attachment portion;
   a footrest portion coupled to the support portion wherein the support portion is configured to suspend the footrest portion and to transfer weight from the footrest portion to the seat-back attachment portion; and
   a cover which is connected to at least one of the seat-back attachment portion, the support portion and the footrest portion, wherein when the apparatus is in a folded position, the cover is configured to substantially enclose the apparatus and to maintain the apparatus in the folded position, wherein the cover is integral to the footrest portion, the footrest portion including a substantially rigid lateral member, a layer of padding secured to the rigid lateral member, and a fabric sheath enclosing the lateral member and the padding, wherein the fabric sheath extends outward to form a pair of flaps that are configured to wrap around the seat-back attachment portion and the support portion and thereby secure the seat-back attachment portion and the support portion to the footrest portion.

2. The apparatus of claim 1, wherein the seat-back attachment portion is configured to be removably positioned on top of the seat-back and held in position by the weight transferred by the support portion.

3. The apparatus of claim 2, wherein the seat-back attachment portion has a non-slip surface configured to contact the seat-back.

4. The apparatus of claim 1, wherein the support portion is configured to adjustably suspend the footrest portion from the seat-back attachment portion at a position which is a variable distance below the seat-back attachment portion.

5. The apparatus of claim 1, wherein the apparatus comprises an adjustable loop of fabric, a first portion of the loop forming the seat-back attachment portion, a second portion of the loop forming the support portion and a third portion of the loop forming the footrest portion.

* * * * *